United States Patent Office

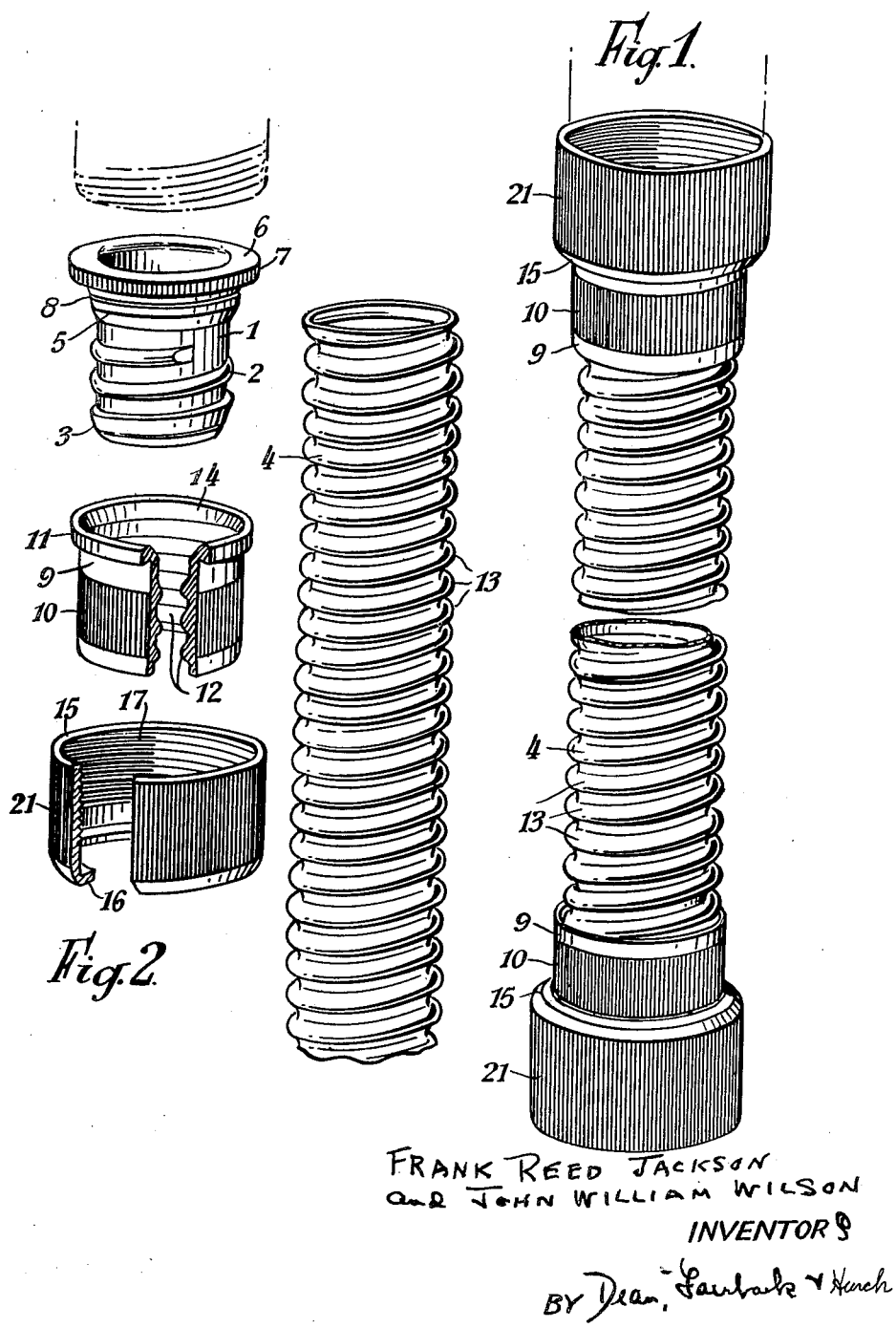

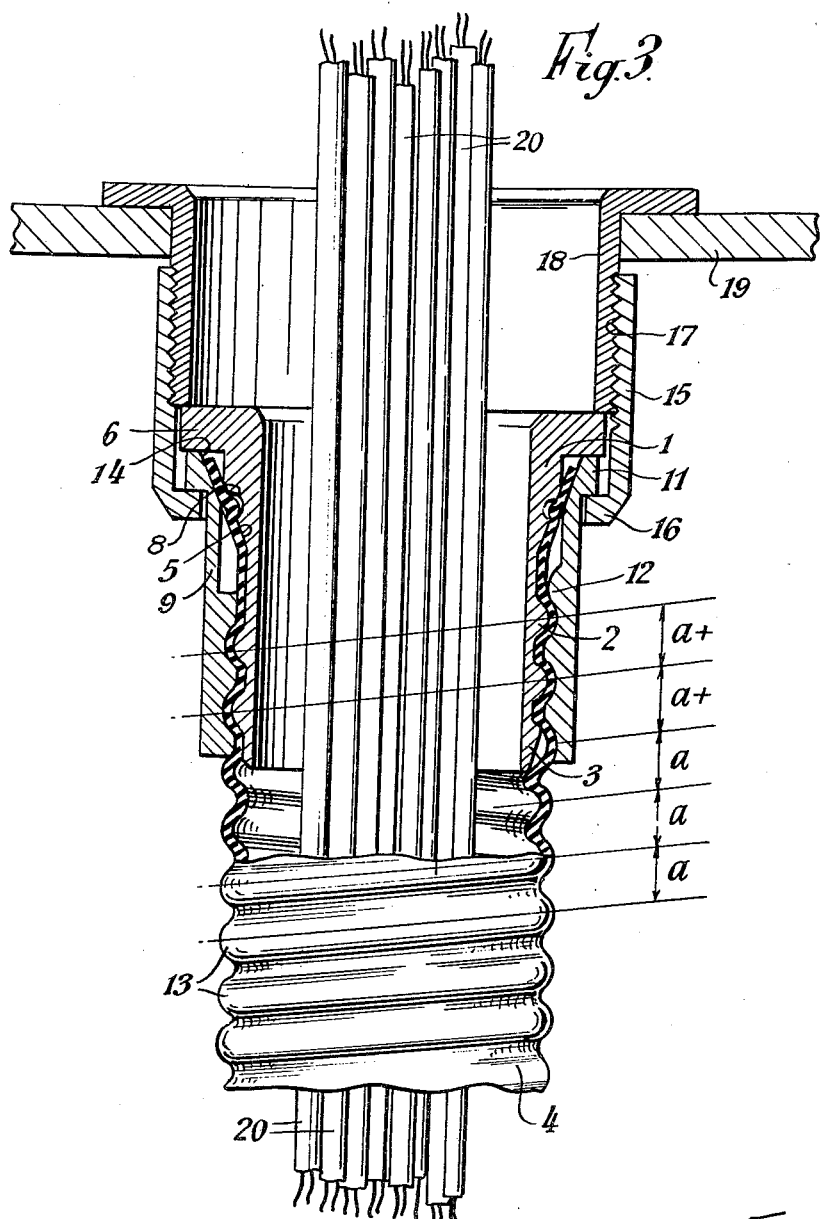

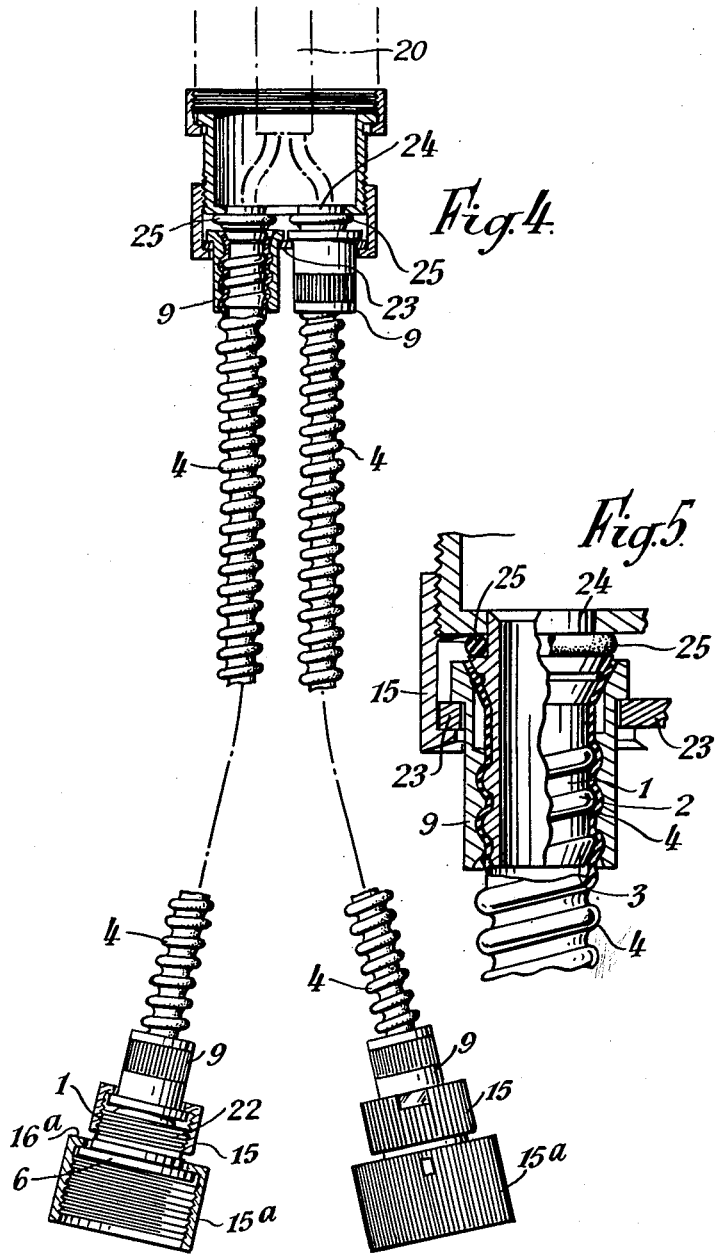

3,078,109
Patented Feb. 19, 1963

3,078,109
END FITTING FOR A HELICAL
CONVOLUTED HOSE
Frank Reed Jackson, Burnham, and John William Wilson, Slough, England, assignors to Superflexit Limited, Slough, England
Filed Aug. 25, 1958, Ser. No. 757,065
Claims priority, application Great Britain May 21, 1958
1 Claim. (Cl. 285—251)

The present invention is concerned with end fittings for use with non-metallic hoses, conduits or the like generally, and particularly hoses, conduits or the like wherein the walls of the hoses or conduits are formed internally and externally with helical convolutions.

The invention is furthermore concerned with a system of electrical conduiting wherein the conduits are so formed and have end fittings in accordance with the present invention, such a system of electrical conduiting having many uses but being particularly suitable for use on aircraft, rockets or guided missiles where it is often necessary to use a large number of individual electrical conductors which are bunched together within a conduit as distinct from being in the form of a multi-core cable.

Such a conduit must necessarily be flexible throughout its length to enable it to be bent to a small radius of curvature and furthermore it must be sufficiently strong in a radial direction to avoid any tendency for the conduit to kink or be flattened when bent in such a manner, bearing in mind that it may be necessary after the conduit has been installed to introduce one or more additional conductors which might be difficult if the conduit were not truly circular in cross-section.

Furthermore, it is essential that the end fittings shall be capable of removal and replacement without resulting in damage to the conduit and in many cases it is essential or desirable that the end fittings shall have a sealed connection with the conduit so as to prevent the entry of moisture, air or other gases into the interior of the conduit.

Such a system of conduiting and end fittings could, therefore, take the form of a harness in which case the harness could be of quite complicated form including, for example, a large diameter conduit leading to a number of branch or smaller diameter conduits along which branch conductors could pass to suitable attachment points. If in the form of a harness, the harness could be supplied complete with end fittings and electrical conductors soldered or otherwise attached at their ends to suitable pins, sockets, or other electrical connecting members, whereby the complete harness could be quickly installed in position.

An end fitting in accordance with the present invention for use with a flexible hose or conduit, comprises a nipple formed with an externally arranged screw-thread for forming, or entering and engaging, internal helical convolutions of the hose or conduit, a sleeve internally screw-threaded to form, or engage, external helical convolutions of the hose or conduit and a cylindrical locking member in captive relationship with the sleeve to connect the nipple, sleeve and hose or conduit with the part with which it is to be associated, the nipple and sleeve being formed respectively with external and internal surfaces of frusto-conical or other suitable shape to engage and grip the hose or conduit at its extremity as a result of appropriate relative rotation of the sleeve and nipple.

The hose or conduit has comparatively thin walls and consequently interengagement of the nipple and sleeve with the end of the hose or conduit will force the end of the conduit to assume the desired helical convolute shape, if the helical convolutions were not previously formed in the hose or conduit during manufacture. Such an arrangement could, of course, be used in the case of the invention being applied to a hose which is not necessarily kinked or bent during use, but where the hose necessarily has to pass around curves of small radius, it is preferred that the hose shall be of the helical formation above referred to.

It is preferred that the screw-threads on the nipple and sleeve shall be of slightly greater pitch than the pitch of the helical convolutions on the hose or conduit, whereby when the nipple is screwed into position, the convolutions on the hose or conduit will tend to flatten out, thereby in effect increasing the effective internal diameter of that part of the hose immediately surrounding the nipple so that the internal diameter of the nipple corresponds to the internal diameter of the remainder of the hose or conduit, thereby providing a smooth and unbroken interior surface permitting the easy introduction of the electrical conductors, or in the case of a hose, the uninterrupted flow of fluid.

Referring to the drawings:

FIGURE 1 is a perspective view of a length of helically convoluted conduit carrying two end fittings in accordance with the invention;

FIGURE 2 is an exploded view, only one end fitting however being shown;

FIGURE 3 is a fragmentary longitudinal section drawn to an enlarged scale of the end fitting and its associated conduit;

FIGURE 4 illustrates one form of harness in accordance with the invention; and

FIGURE 5 is a fragmentary sectional view.

In a preferred embodiment of the invention, the nipple 1 is of cylindrical shape formed externally with a screw-thread 2, the extremity 3 of the nipple being tapered to facilitate its introduction into the hose or conduit 4.

The nipple is, furthermore, formed with a frusto-conical surface 5 and with an outwardly directed annular lip 6. The manner lip is knurled exteriorly at 7 whilst the frusto-conical surface is formed with an annular groove 8 which, it is thought, will assist in obtaining a good seal between the hose or conduit and the nipple, there being a tendency for the material comprising the hose or conduit to be forced into the annular groove.

Instead of the material being actually forced into the annular groove, the latter may be of square or other suitable shape to accommodate a neoprene or other type of O ring, in which case tightening of the fitting will compress the O ring into intimate engagement with the hose or conduit to provide a good seal. This is particularly necessary with materials which are subject to cold flow when under compression with a resultant loss of a satisfactory seal. In this connection it will be appreciated that a sufficient area of the ring will remain proud of the recess to ensure satisfactory engagement of the ring with the hose or conduit when cold flow takes place.

The sleeve 9 also is of cylindrical shape and is knurled exteriorly, as at 10, one end of the sleeve being formed with an annular lip 11, the sleeve being internally screw-threaded at 12 to engage the external convolutions 13 of the hose or conduit and to co-operate with the external screw-thread on the nipple, the hose or conduit being sandwiched between the two components. In practice, it is preferred to screw the nipple into the open end of the hose or conduit so that finally the end of the hose is forced to assume a bell mouth as shown in FIGURE 3, the end of the conduit being forced up the frusto-conical surface 5. The sleeve 9, which has previously been placed in position on the hose or conduit, is then screwed along the conduit into a position in which it engages the belled end of the conduit, the extremity of the sleeve being internally coned at 14 to an angle corresponding with the frusto-conical surface of the nipple so that the belled extremity of the hose or conduit is firmly gripped between the two conical surfaces to provide a good seal, the material comprising the hose, as previously explained, tending to be forced into the annular groove in the frusto-conical surface of the nipple.

The end fitting includes a third component in the form of a sleeve nut 15 having an internally directed annular lip 16 at one end, which lip engages the lip 11 on the sleeve, the nut being internally screw-threaded at 17 to engage a junction box 18 or other part (see FIGURE 3) with which the hose or conduit and its associated parts are to be connected. In FIGURE 3 the part 18 may be a junction box as stated or it may merely be a form of tubular attachment piece associated with a bulkhead 19 through which the various conducting wires 20 have to pass.

It is preferred that the nut shall be externally knurled at 21, the knurling on the three components enabling the component parts of the end fitting to be assembled together by hand.

Instead of the nut having a screw-threaded connection with the junction box or other part, the nipple may itself be externally screw-threaded as at 22 in FIGURE 4 to receive the nut 15, in which case the nut will itself directly connect together the sleeve 9 and nipple 1.

In such a case, it is proposed that a further nut 15a shall be provided of similar form, but larger, which nut is again provided with an inwardly directed lip or flange 16a, which engages an outwardly directed lip or flange 6 on the nipple and holds the nipple in position upon the junction box or other part, this second nut 15a being internally screw-threaded to engage the junction box or the like.

The invention facilitates the use of multiple outlets from an electrical plug or socket, junction box or the like, and in such a case a number of, for example two, conduits may emanate from the one junction box or other component as in FIGURE 4. In such a case, each conduit may have a nipple and sleeve constructed substantially in the manner hereinbefore described, the sleeves being passed through holes formed in a mounting plate 23, which plate maintains the conduits spaced apart a suitable distance, the outwardly directed lips or flanges 11 on the sleeves 9 engaging the plate 23 immediately surrounding each hole.

The plate is of a suitable diameter to fit inside a securing nut 15 and to be held in place by an internally arranged lip or flange 16 at one end of the nut. In this arrangement, each nipple is formed with a short spigot 24 which stands proud of the end of each sleeve when the parts are assembled on the end of the conduit (see particularly FIGURE 5). These spigots are located in the completed assembly in holes drilled in the plug or socket outlet, junction box or the like 16, the holes being drilled in such a manner that their centres are in register with the centres of the corresponding holes in the plate 23. Sealing rings 25 of, for example, the O type are fitted over the spigots 24 on the nipples to ensure a pressure tight joint when the securing nut 15 is finally tightened. In cases where it is not practicable to fit a securing nut, the locking plate 23 can be secured by studs, set screws, bolts or the like to the object to which the conduits are to be attached.

The junction box or the like is secured to a bulkhead or other part by means of a ring nut 26 the nut having an inwardly directed lip 27 which engages a lip 28 on the junction box or a series of radial projections thereon, the ring nut having a screw threaded connection with the part to which it is to be secured.

Although it is within the scope of the invention to form each hose or conduit from any suitable non-metallic material, it is preferred to construct it from a thermoplastic material, such as polyvinyl chloride, one of the fluoro-carbon products, such as polytetrafluoroethylene or one of the polyamides, although as a further alternative the hose or conduit may be composed of natural or synthetic rubber.

It will be appreciated from the foregoing description that owing to the thin walled nature of the hose or conduit, the helical convolutions will either be produced as a result of the entry of the nipple into the end of the hose and by the external application of the sleeve, or if previously formed, will be distorted or partially flattened out as a result of the interengagement of the nipple and sleeve with the convolutions, the extremity of the hose or conduit being stretched axially slightly during the application of the end fitting. This is shown clearly in FIGURE 3 the pitch of the helical convolutions of the conduit being indicated by $a$ whilst the pitch of the screw threads on the nipple and that part of the conduit in engagement therewith being indicated by $a+$, this view also showing clearly how the internal bore of the nipple corresponds with that of the conduit.

In certain cases it may be desirable for the nipples to be lined with the same material from which the hose or conduit is constructed. This is particularly desirable when the assemblies are likely to be subjected to severe vibrations which could cause damage to electrical conductors or the like, due to contact with metal surfaces and subsequent abrasion or bruising of the insulating material.

Although it is proposed in carrying out the invention to construct the parts of the end fitting from metal, for example, a lightweight aluminum alloy, they may alternatively be constructed from nylon or other suitable thermoplastic material, or even from a synthetic resin of the thermo-hardening type.

The tubing from which the convoluted hose or conduit is to be made is preferably extruded in the orthodox fashion and processed according to the material from which it is manufactured. One method is as follows.

A wire helical spiral is formed on a mandrel, the mandrel being the same size in diameter as the required finished bore size of the convoluted conduiting or housing. The pitch of the wire helical spiral determines the pitch of the helical convolutions of the conduit and the gauge or diameter of the wire determines the form of the convolutions. The bore of the tubing before convoluting should be an easy fit over the wire helical spiral and it is slid over this spiral. Wire, of predetermined size, is fed on to the outside of the tubing so that it forms a helical spiral on the outside with a pitch equal to the internal wire helical spiral and spaced equally between the convolutions of same. Sufficient tension is put on the outside to ensure that the tubing is pulled down to the mandrel at the lowest point of the convolutions. The wire on the outside is secured at one end of the mandrel prior to feeding on to the outside of the tubing, and secured at the other end of the mandrel after completion, to ensure the convolutions in the housing or conduit are maintained during the setting process. The setting of the convolutions is obtained by applying heat for a specific period, the length of period depending on the material from which the tubing is manufactured, followed by rapid cooling if required. The external and internal wire helical spirals are now removed leaving the conduit or housing in the convoluted form.

We claim:

The combination of an end fitting and a thin walled flexible conduit, the walls of which conduit are of uniform thickness and are formed with internally and externally arranged helical convolutions extending over substantially its entire length, said end fitting comprising an externally screw threaded tubular nipple screwing into the end of the helically convoluted conduit, a tubular internally screw threaded circumferentially continuous sleeve screwing onto the end of the helically convoluted conduit, the nipple and sleeve being formed with oppositely positioned frusto-conical faces for engaging the inner and outer surfaces of the conduit near its end to grip the conduit as a result of appropriate relative rotational movement between said nipple and said sleeve, the threads on both nipple and sleeve having a pitch greater than the pitch of the conduit convolutions whereby the convolutions of the conduit will be stretched when the nipple and sleeve are rotated relative to each other.

References Cited in the file of this patent

UNITED STATES PATENTS

| | | |
|---|---|---|
| 1,953,701 | Clark | Apr. 3, 1934 |
| 2,230,115 | Kreidel | Jan. 28, 1941 |
| 2,267,416 | Neukirch | Dec. 23, 1941 |
| 2,438,679 | Parker | Mar. 30, 1948 |
| 2,439,351 | Thayer et al. | Apr. 6, 1948 |
| 2,518,426 | Kimander | Aug. 8, 1950 |
| 2,523,995 | Parmesan | Sept. 26, 1950 |
| 2,545,263 | Coryum | Mar. 13, 1951 |
| 2,559,753 | Birch | July 10, 1951 |
| 2,870,668 | Flahaut | Jan. 27, 1959 |
| 2,918,314 | Kemnitz | Dec. 22, 1959 |

FOREIGN PATENTS

| | | |
|---|---|---|
| 1,163 | Great Britain | Mar. 23, 1878 |
| 86 | Great Britain | Jan. 1, 1898 |
| 6,397 | Great Britain | Mar. 13, 1914 |
| 66,805 | Austria | Apr. 1, 1914 |
| 449,042 | Great Britain | June 19, 1936 |
| 856,034 | France | May 25, 1940 |
| 922,314 | Germany | Nov. 25, 1954 |
| 771,824 | Great Britain | Apr. 13, 1957 |